United States Patent [19]

Ikeda et al.

[11] 4,380,607

[45] Apr. 19, 1983

[54] RUBBER COMPOSITION HAVING HIGH MODULUS OF ELASTICITY AND PROCESS FOR PREPARING SAME

[75] Inventors: Hiroharu Ikeda, Machida; Kohei Goto, Fukuoka; Yasuyuki Shimozato, Yokohama, all of Japan

[73] Assignee: Japan Synthetic Rubber Co., Ltd., Tokyo, Japan

[21] Appl. No.: 256,921

[22] Filed: Apr. 23, 1981

[30] Foreign Application Priority Data

Apr. 28, 1980 [JP] Japan ................................ 55/55450
May 27, 1980 [JP] Japan ................................ 55/69570

[51] Int. Cl.$^3$ ............................................... C08L 9/00
[52] U.S. Cl. .................................... 525/232; 525/216; 525/198; 525/240; 525/241
[58] Field of Search ............... 260/4 R; 525/240, 232, 525/241, 216

[56] References Cited

U.S. PATENT DOCUMENTS 3,701,702 10/1972 Shichman et al. .................. 525/176
3,751,524 8/1973 Hugh et al. ......................... 525/232

Primary Examiner—J. Ziegler
Attorney, Agent, or Firm—Oblon, Fisher, Spivak, McClelland & Maier

[57] ABSTRACT

A rubber composition consisting essentially of a dispersion in which particles of a high-melting isotactic poly-α-olefin having a melting point of at least 150° C. are uniformly dispersed in a rubber matrix, said particles having an average particle size of not more than 200μ, has a high modulus of elasticity and also excellent tear resistance. Such rubber composition can be obtained, for example, by mixing fine powder of said isotactic poly-α-olefin having an average particle size of not more than 200μ with a rubber solution, dispersing the particles uniformly in said rubber solution and recovering a rubber composition from the dispersion.

10 Claims, No Drawings

RUBBER COMPOSITION HAVING HIGH MODULUS OF ELASTICITY AND PROCESS FOR PREPARING SAME

BACKGROUND OF THE INVENTION

1. Field of the Invention

This invention relates to a novel rubber composition having a high modulus of elasticity and excellent tear resistance, said composition consisting essentially of a rubber matrix having micro-dispersed therein fine particles of a high-melting isotactic poly-α-olefin, and a novel process for preparing said rubber composition.

2. Description of the Prior Art

In certain specific fields of industry, there have recently become desired vulcanized rubbers having a higher modulus of elasticity than the generally available vulcanized rubbers. In this case, it is desirable that the other physical properties than the modulus of elasticity are substantially tha same as those of the commercially available vulcanized rubbers and the processability in the production of vulcanized rubber articles is also excellent.

As a means for increasing the modulus of elasticity of vulcanized rubber, a method is known by which a material having a high modulus of elasticity (such as carbon black, resin, etc.) in a powdery or fibrous form is mixed with the rubber. However, the product of such a method is not satisfactory in dispersibility of the high modulus-of-elasticity material in the rubber, processability of the mixture and other physical properties of vulcanizate than modulus, for example, tear resistance and the like.

Attempts have been made for improving the modulus of elasticity and strength of rubber by micro-dispersing a resin in a rubber matrix, and it is disclosed that a rubber composition comprising a highly crystalline 1,2-syndiotactic polybutadiene shows a high modulus of elasticity and that a rubber composition having excellent tear resistance and also well balanced physical properties can be obtained by a certain specific method. For example, Japanese Patent Publication Nos. 17666/74 and 17667/74 disclose a two-step polymerization method which comprises cis-1,4-polymerization and subsequent 1,2- polymerization of 1,3-butadiene, and Japanese Patent Application Kokai (Laid-Open) No. 126050/78 discloses a method by which 1,2-syndiotactic polybutadiene powder is mixed with rubber and the mixture is treated at a temperature which is at least 5° C. higher than the melting point (around 200° C.) of 1,2-syndiotactic polybutadiene and extruded into the form of string or sheet. However, the former method has a difficulty in controlling the properties of the polymer mixture and is also subject to a restriction that the rubber must be cis-1,4-polybutadiene. On the other hand, the latter method, although open to use of various types of rubber, has problems in that it requires the specific processing conditions such as a high temperature required in the rubber processing operations and that the control of the processing temperature is difficult because 1,2-syndiotactic polybutadiene is liable to gel at elevated temperatures. Further, since the melting point of 1,2-syndiotactic polybutadiene is around 200° C., there arises a problem in practical applications where a use temperature higher than the melting point of said polybutadiene is required.

The present inventors have conducted extensive research for obtaining a rubber composition having a high modulus of elasticity and excellent tear resistance without restricting the rubber to be used nor requiring any special processing conditions by incorporating thereinto a crystalline polymer superior in heat resistance to 1,2-syndiotactic polybutadiene, and as a result, it has been found that a novel rubber composition having a high modulus of elasticity and excellent tear resistance can be produced commercially advantageously by blending and micro-dispersing a high-melting isotactic poly-α-olefin in rubber by a specific method.

SUMMARY OF THE INVENTION

According to this invention, there is provided a rubber composition having a high modulus of elasticity consisting essentially of a dispersion in which particles of a high-melting isotactic poly-α-olefin having a melting point of at least 150° C., said particles having an average particle size of not more than 200μ, are uniformly dispersed in a rubber matrix.

There is further provided according to this invention a process for producing a rubber composition having a high modulus of elasticity consisting essentially of a dispersion in which particles of a high-melting isotactic poly-α-olefin having a melting point of at least 150° C., said particles having an average particle size of not more than 200μ, are uniformly dispersed in a rubber matrix, which comprises:

(1) mixing fine powder of said poly-α-olefin having an average particle size of not more than 200μ with a rubber solution, dispersing the particles of said polymer in said rubber solution and recovering a rubber composition from the dispersion, or (2) subjecting said poly-α-olefin swollen with an organic solvent to a mechanical shearing force to form a dispersion, mixing the dispersion with a rubber solution and recovering a rubber composition from the mixture, or (3) stirring and dispersing fine powder of said poly-α-olefin having an average particle size of not more than 200μ in an organic solvent to form a suspension, mixing this suspension with a rubber solution and recovering a rubber composition from this mixture.

DETAILED DESCRIPTION OF THE INVENTION

The high-melting isotactic poly-α-olefin used in this invention has a melting point of at least 150° C, preferably at least 160° C. If the melting point of the polymer is less than 150° C., such a polymer is melted under the rubber vulcanizing conditions, and hence, no good properties are obtained. The polymers suitable for use in this invention include isotactic polypropylene, polyallylcyclopentane, polyallylcyclohexane, polyallylbenzene, poly(3-methyl-1-butene), poly(3-cyclohexyl-1-butene), poly(4-phenyl-1-butene), poly(3-methyl-1-pentene), poly(4-methyl-1-pentene), poly(3-methyl-1-hexene), poly(4-methyl-1-hexene), polyvinylcyclopentane, and copolymers of two or more α-olefins such as copolymer of propylene and allylbenzene and copolymer of 3-methyl-1-butene and 1-butene. Among them, isotactic polypropylene and poly(4-methyl-1-pentene) are preferred. Particularly, isotactic polypropylene is preferred for the applications where high tensile strength is required and poly(4-methyl-1-pentene) is suited to uses where strong tear strength is required. Poly(4-methyl-1-pentene) can be synthesized, for example, by using a Ziegler-Natta catalyst composed of triethylaluminum and titanium tetrachloride (e.g., see British Pat. No. 944,055). This polymer has a melting point of at least 200° C. Because of high crystallinity, poly(4-methyl-1-pentene) is sparingly soluble in ordinary hydrocarbons or halogenated hydrocarbons at or around room temperature. Also, the isotactic polypropylene used in this invention can be prepared by a conventional polymerization with a Ziegler-Natta catalyst [e.g., see G. Natta: Stereoregular Polymerization, Pergamon Press (1967)]. This polymer has a melting point of at least 150° C. and contains more than 90% of isotactic polymer.

The rubber to be mixed with a high-melting isotactic poly-α-olefin in this invention includes polyisoprene rubber, polybutadiene rubber, styrene-butadiene rubber, butadiene-pentadiene-styrene rubber, ethylene-propylene rubber, isobutylene-isoprene rubber and natural rubber. Among them, polyisoprene rubber, polybutadiene rubber and styrene-butadiene rubber are preferred.

The mixing method (1) proposed in this invention comprises mixing fine powder of a high-melting isotactic poly-α-olefin having an average particle size of not more than 200μ in a rubber solution. According to this method, the polymer is uniformly dispersed in the form of fine particles in the rubber to meet the purpose of this invention.

The fine powder of a high-melting isotactic poly-α-olefin having an average particle size of not more than 200μ used in this invention can be obtained either by a method by which a high-melting isotactic poly-α-olefin is formed into powder or pellets, and added to and swollen with an organic solvent and the swollen polymer is mechanically stirred vehemently along with an aqueous surfactant solution and then heated by steaming to remove the organic solvent (pulverization method), or by a method by which an isotactic poly-α-olefin is formed by polymerization with a Ziegler-Natta catalyst and the particles having a size of not more than 200μ are selected out of the obtained fine powder slurry polymer (screening method). These methods, however, are not the only means available.

The fine powder of high-melting isotactic poly-α-olefin used in this invention is required to have an average particle size of not more than 200μ. If the average particle size of the polymer exceeds 200μ, the dispersion of the powder in rubber becomes inferior, and hence, the properties of the resulting rubber composition are remarkably decreased. Thus, the preferred average particle size of the polymer is not more than 100μ, more preferably not more than 50μ. The above-mentioned pulverization method is most preferable as it can produce fine particles with an average particle size of not more than 50μ.

Any organic solvent capable of dissolving rubber may be used as a solvent for forming the rubber solution in this invention. Also, the rubber solution used in this invention may be prepared by dissolving solid rubber in an organic solvent or may be a rubber polymer solution formed by polymerizing a monomer in an organic solvent. This rubber polymer solution may contain a terminator and/or an anti-aging agent, but the presence of such substances does not adversely affect mixing said fine powder with said solution. Also, such a rubber polymer solution may be diluted with an organic solvent. The solids concentration in the rubber solution is usually within the range of 0.5 to 40% by weight, preferably 1 to 20% by weight. Fine powder of a high-melting isotactic poly-α-olefin is added in an amount sufficient for providing the desired concentration thereof in the rubber depending upon the use of the rubber composition.

When mixing fine powder of a high-melting isotactic poly-α-olefin with a rubber solution in this invention, it is recommended that the mixture be stirred to achieve a more uniform dispersion. Said stirring can be accomplished in any conventional means, such as by means of a propeller type or turbine type stirrer. Also, the mixing and stirring may be performed under normal pressure or under pressure at a temperature from 0° to 130° C.

The mixing ratio or a high-melting isotactic poly-α-olefin to rubber is not critical, but it is preferable that said polymer be mixed in such a ratio that the content thereof in the produced rubber composition becomes 2 to 40% by weight. The particularly preferable content is 3 to 30% by weight. If the polymer content is less than 2% by weight, there is provided no satisfactory effect of improving the modulus of elasticity, while if the polymer content exceeds 40% by weight, the processability of the composition is deteriorated.

The recovery of the rubber composition after mixing may be accomplished by using a conventional technique for recovering rubbery polymers, for example, by contacting the composition with a large quantity of a non-solvent or by adding a surfactant to the composition and then contacting it with steam.

In the mixing method (2) according to this invention, it is important to subject to a mechanical shearing force a high-melting isotactic poly-α-olefin swollen with an organic solvent. The "subjecting the polymers to a mechanical shearing force" is achieved by stirring the polymer vehemently by a mechanical means such as a high-speed mixer to pulverize the polymer into fine swollen particles. It is to be noted that when the solid polymer is subjected to a mechanical shearing force the desired fine particles having an average particle size of not more than 200μ which can be readily dispersed in rubber cannot be obtained. It should be appreciated that the object of this invention can be attained only when the swollen polymer is subjected to a mechanical shearing force and the formed dispersion is then mixed with a rubber solution. The method by which an isotactic poly-α-olefin is formed into a solution and then blended with a rubber solution is not recommended for the reason of possible deterioration of rubber quality and consumption of energy because both polymers must be maintained at an elevated temperature.

The organic solvent-swollen high-melting isotactic poly-α-olefin used in this invention may be a swollen polymer mixture obtained by polymerizing the monomer in an organic solvent with a Ziegler-Natta catalyst or may be a swollen polymer obtained by adding a powdered or pelletized isotactic poly-α-olefin to an organic solvent to swell the polymer with the solvent. The former method is advantageous commercially as the solvent-swollen polymer is obtained upon the polymerization, and the latter method is particularly advantageous in industry because a desired swollen polymer can always be obtained even when the organic solvent used in the polymerization cannot swell the polymer formed in the polymerization. The mechanical shearing force may be obtained, for example, by high-speed stirring with the toothed disc impeller blades or by means of a grinder. These methods can break the swollen polymer into fine particles.

Solvents such as hydrocarbons or halogenated hydrocarbons may be used as the organic solvent for swelling the high-melting isotactic poly-α-olefin in this invention. Examples of said solvents are benzene, toluene, xylene, tetrahydronaphthatene, hexane, heptane, octane, cyclohexane, methylene chloride, ethylene dichloride, ethane tribromide, chlorobenzene, bromobenzene, o-dichlorobenzene and mixtures thereof. Among these solvents, the hydrocarbon compounds having a boiling point of 120° C. or less such as benzene, toluene, hexane, heptane, and cyclohexane are preferred in respect of solvent recovery.

The term "organic solvent-swollen polymer" used herein refers to a high-melting isotactic poly-α-olefin having absorbed a solvent and expanded, namely, a jelly-like or custard pudding-like polymer. The polymer concentration in the swollen polymer is usually 0.5 to 40% by weight, preferably 1 to 20% by weight.

The rubber solution used in the mixing method (2) may be the same as described in connection with the mixing method (1).

To mixing of the dispersion obtained from the swollen high-melting isotactic poly-α-olefin with the rubber solution may be applied the same means and conditions as used in the mixing method (1). Also, the recovery of the rubber composition from the mixture may be performed in the same way as in the mixing method (1). The average particle size of isotactic poly-α-olefin in the rubber composition recovered by the method (2) is not more than $50\mu$, usually $0.1-5\mu$.

The mixing method (3) of this invention comprises stirring and dispersing fine powder of a high-melting isotactic poly-α-olefin having an average paticle size of not more than $200\mu$ in an organic solvent, mixing the resulting suspension with a rubber solution and recovering a rubber composition from this mixture. This method can uniformly disperse the polymer in the form of fine particles in rubber to attain the object of this invention. The fine powder of a high-melting isotactic poly-α-olefin with an average particle size of not more than $200\mu$ used in this method (3) may be the same as employed in the mixing method (1) described before.

Organic solvents such as hydrocarbons or halogenated hydrocarbons may be used as the solvent in which to disperse the fine powder of a high-melting isotactic poly-α-olefin in this method. Examples of such organic solvents are benzene, toluene, xylene, tetrahydronaphthalene, hexane, heptane, octane, cyclohexane, methylene chloride, ethylene dichloride, ethane tribromide, chlorobenzene, bromobenzene, o-dichlorobenzene and a mixture thereof. Among them, the hydrocarbon compounds having a boiling point of not more than 120° C. such as benzene, toluene, hexane, heptane and cyclohexane are preferred in respect of solvent recovery.

Any organic solvent capable of dissolving rubber may be used as a solvent for forming the rubber solution. Said solvent is not necessarily be the same as the organic solvent used for dispersing an isotactic poly-α-olefin, but it is commercially advantageous to use the same solvent.

The term "suspension" used herein refers to a suspension in which fine particles of an unswollen or slightly swollen polymer are suspended in and diluted with a solvent, and in this case, the solvent acts merely as a diluting and dispersing medium. The suspended polymer concentration is usually within the range of 0.1 to 25% by weight, preferably 0.1 to 10% by weight. Such a suspension can be obtained by mechanically mixing and stirring fine powder of a high-melting isotactic poly-α-olefin in an organic solvent. For avoiding flocculation of the fine particles and for maintaining a good condition of dispersion, it is desirable to perform high-speed stirring with, for example, toothed disc impeller blades or to conduct vigorous stirring at a rate of over 2,000 r.p.m. by using, for example, Homomixer MV-H by Tokushu Kika Kogyo Co., Ltd. Although the temperature condition for this operation is not critical, usually a temperature of 0° to 100° C. may be used conveniently. The rubber solution used in the mixing method (3) may be the same as described in connection with the mixing method (1).

In this invention, the mixing of the suspension of a particulate high-melting isotactic poly-α-olefin in an organic solvent and a rubber solution can be accomplished in an ordinary way, for example, by using a propeller-type or turbine-type stirrer. For the most efficient mixing, it is recommended to use a high-speed stirrer such as mentioned in respect to the preparation of suspension. As for the order of mixing, a rubber solution may be added to a suspension of a high-melting isotactic poly-α-olefin with stirring, or the latter may be added to the former, or both of them may be added simultaneously to a vessel and mixed therein. The mixing temperature is not critical, but usually a temperature of 0° to 100° C. is conveniently used. The mixing time is also not critical, though it may be sufficient enough to uniformly mix the two.

The high-melting isotactic poly-α-olefin to rubber mixing ratio and the rubber composition-recovering method may be the same as mentioned in respect to the mixing method (1) described before.

The rubber composition of this invention may be put to practical uses either alone or in admixture with other rubbers. Said other rubbers include polyisoprene rubber, polybutadiene rubber, styrene-butadiene rubber, ethylene-propylene rubber, butyl rubber, natural rubber, etc., but diene rubber and natural rubber are preferred for use in combination with the composition of this invention.

In practical applications of the rubber composition of this invention, it may contain a reinforcing agent and other compounding agents which are usually compounded with rubber. Also, any suitable technique generally employed in rubber preparation may be used for processing and vulcanization of the composition of this invention.

The present invention is described in further detail below referring to Examples, but the Examples are merely by way of illustration and not by way of limitation.

EXAMPLE 1

Poly(4-methyl-1-pentene) having a melting point of 235° C. (produced by ICI, Inc.) was swollen with toluene in a proportion of 20 parts by weight per part by weight of said polymer and the swollen polymer was stirred in an aqueous solution of potassium salt of rosin acid by means of a high-speed mixer (Homomixer MV-H manufactured by Tokushu Kika Kogyo Co. Ltd.) at 10,000 r.p.m. In the latter half of the stirring, the solution was subjected to steaming to remove the solvent. Potassium salt of rosin acid was used in an amount of 3 g per gram of poly(4-methyl-1-pentene). The powder thus obtained was washed with water and then dried. It had an average particle size of $20\mu$.

This fine powder was added to a hexane solution of polyisoprene rubber (IR2200 produced by Japan Synthetic Rubber) (solids concentration: 10% by weight), and the mixture was poured into a large amount of methanol containing a small quantity of 2,6-di-t-butyl-p-cresol to be solidified. The solidified rubber composition was dried in vacuo for 24 hours. The poly(4-methyl-1-pentene) content in the composition was 10%.

This rubber composition was then compounded with the compounding agents according to the recipe shown in Table 1. The compound was subjected to press vulcanization at 145° C. for 20 minutes and the resulting vulcanizate was subjected to a tensile test according to JIS K-6301 to determine the physical properties of the product. The results are shown in Table 2. It can be seen that this rubber composition has a high modulus of elasticity.

TABLE 1

| | |
|---|---|
| Polymer | 100 parts by weight |
| Carbon black (ISAF) | 50 parts by weight |
| Aromatic oil (JSR AROMA)*1 | 10 parts by weight |
| Zinc oxide | 5 parts by weight |
| Stearic acid | 1 parts by weight |
| Anti-aging agent (810-NA)*2 | 1 parts by weight |
| Vulcanization accelerator, CZ*3 | 1.5 parts by weight. |
| Sulfur | 2.5 parts by weight |

*1High aromatic extender oil
*2N—Phenyl-N'—isopropyl-p-phenylenediamine
*3N—Cyclohexyl-2-benzothiazylsulfenamide

EXAMPLE 2

Polypropylene having a melting point of 165° C. (Noblene produced by Mitsubishi Yuka) was pulverized into fine particles having an average particle size of 25$\mu$ in the same way as in Example 1.

This fine powder was mixed in an n-hexane solution of IR2200, and the rubber composition was then recovered, compounded and vulcanized and physical properties of the vulcanizate were determined, all the steps were the same as in Example 1.

The polymer contained 10% by weight of polypropylene.

The obtained composition had a high modulus of elasticity.

EXAMPLE 3

The procedure of Example 2 was repeated, except that a toluene solution of BR01 (polybutadiene rubber produced by Japan Synthetic Rubber) was substituted for the n-hexane solution of IR2200. The produced composition showed a high modulus of elasticity.

EXAMPLE 4

The procedure of Example 1 was repeated, except that a toluene solution of SBR#1500 was substituted for the n-hexane solution of IR2200.

COMPARATIVE EXAMPLES 1–3

IR2200, BR01 and SBR#1500, each having not been mixed with poly(4-methyl-1-pentene) or polypropylene, were respectively compounded with the compounding agents according to the recipe of Table 1 and processed. However, vulcanization was performed at 145° C. for 20 minutes in the case of IR2200 and BR01 and at 145° C. for 60 minutes in the case of SBR#1500.

EXAMPLE 5

The procedure of Example 1 was repeated, except that the poly(4-methyl-1-pentene) content in the rubber composition was changed to 5% by weight.

EXAMPLE 6

The procedure of Example 2 was repeated, except that the isotactic polypropylene content in the rubber composition was changed to 5% by weight.

COMPARATIVE EXAMPLE 4

The procedure of Example 2 was repeated, except that isotactic polypropylene powder having an average particle size of 400$\mu$ was used. The rubber composition obtained showed a little improvement in modulus of elasticity and a very low tensile strength.

TABLE 2

| | Base rubber | Poly(4-methyl-1-pentene) (wt %) | Polypropylene (wt %) | Particle size ($\mu$) | $M_{100}$ (Kg/cm$^2$) | $M_{300}$ (Kg/cm$^2$) | $T_B$ (Kg/cm$^2$) | $E_B$ (%) |
|---|---|---|---|---|---|---|---|---|
| Example 1 | IR2200 | 10 | — | 20 | 58 | 160 | 235 | 520 |
| Example 2 | IR2200 | — | 10 | 25 | 64 | 171 | 268 | 480 |
| Example 3 | BR01 | — | 10 | 25 | 52 | 197 | 228 | 370 |
| Example 4 | SBR#1500 | 10 | — | 20 | 57 | 152 | 202 | 400 |
| Example 5 | IR2200 | 5 | — | 20 | 33 | 123 | 248 | 550 |
| Example 6 | IR2200 | — | 5 | 25 | 37 | 130 | 270 | 530 |
| Example 7 | IR2200 | — | 10 | 40 | 60 | 165 | 265 | 470 |
| Comp. Ex. 1 | IR2200 | — | — | — | 22 | 105 | 272 | 670 |
| Comp. Ex. 2 | BR01 | — | — | — | 24 | 107 | 140 | 360 |
| Comp. Ex. 3 | SBR#1500 | — | — | — | 34 | 158 | 263 | 440 |
| Comp. Ex. 4 | IR2200 | — | 10 | 350 | 28 | — | 100 | 280 |

EXAMPLE 7

The procedure of Example 2 was repeated, except that isotactic polypropylene powder having an average particle size of 40$\mu$ was substituted for the polymer powder. The rubber composition obtained, although slightly larger in particle size than in Example 2, had a high modulus of elasticity and was not lowered in tensile strength.

EXAMPLE 8

To one part of by weight of poly(4-methyl-1-pentene) having a melting point of 235° C. (a product of ICI) was added 20 parts by weight of toluene, and the resulting mixture was heated to form a solution. After cooling, the swollen polymer was stirred by means of a high-speed mixer (13,000 r.p.m.) for 15 minutes and pulverized under a shearing force.

A predetermined amount of this mixture, while stirring by a propeller stirrer, was added to a predetermined amount of an n-hexane solution (solids concentration: 10% by weight) of IR2200 (polyisoprene rubber produced by Japan Synthetic Rubber, cis-1,4 content: 98%, $ML_{1+4}^{100°\ C.}$: 82), said predetermined amount being such that the poly(4-methyl-1-pentene) content became 7.5% by weight, and the mixture was further stirred for 30 minutes. The mixture was then poured into a large excess of methanol containing a small quanity of 2,6-di-t-butyl-p-cresol to be solidified. The average particle size of poly(4-methyl-a-pentene) in the solidified rubber composition is 0.32μ.

The solidified rubber composition was vacuum-dried for 24 hours and then compounded with the compounding agents according to the recipe shown in Table 1. The compound was subjected to press vulcanization at 145° C. for 20 minutes and the resulting vulcanizate was subjected to a tensile test and a tear test according to JIS K-6301 to determine the physical properties of the poduct. The results are shown in Table 3.

This rubber composition showed excellent tear resistance and a high modulus of elasticity.

EXAMPLE 9

To 20 parts by weight of toluene was added one part by weight of polypropylene having a melting point of 165° C. (Noblene produced by Mitsubishi Yuka), and the mixture was heated to form a solution and then allowed to stand at room temperature. The swollen polymer was stirred by a high-speed mixer (13,000 r.p.m.) for 15 minutes and pulverized under a shearing force.

To a predetermined amount of this mixture, while stirring by a propeller stirrer, was added a predetermined amount of an n-hexane solution (solids concentration: 10% by weight) of IR2200 (polyisoprene rubber produced by Japan Synthetic Rubber, cis-1,4 content: 98%, $ML_{1+4}^{100°\ C.}$: 82), said predetermined amount being such that the polypropylene content became 10% by weight, followed by stirring for an additional 30 minutes.

The mixture was then poured into a large amount of methanol containing a small quanity of 2,6-di-t-butyl-p-cresol to be solidified. The average particle size of polypropylene in the solidified rubber composition is 0.28μ. The solidified rubber composition was subjected to compounding and determination of the properties in the same manner as in Example 8. The results are shown in Table 3. It can be seen therefrom that this rubber composition has a high tensile strength and a high modulus of elasticity while maintaining a satisfactory tear strength.

EXAMPLE 10

The procedure of Example 8 was repeated, except that IR2210 (a product by Japan Synthetic Rubber, cis-1,4 content: 98%, $ML_{1+4}^{100°\ C.}$: 65) was substituted for the IR2200. The results are shown in Table 3. A high-modulus rubber composition having high tear resistance can be obtained even if the Mooney viscosity of IR is changed.

EXAMPLE 11

The same procedure as in Example 10 was repeated, except that the amount of poly(4-methyl-1-pentene) was changed from 7.5% by weight to 5% by weight, to obtain a high-modulus rubber composition having high tear resistance.

EXAMPLE 12

The same procedure as in Example 9 was repeated, except that a toluene solution (solids concentration: 10% by weight) of BR01 (polybutadiene rubber produced by Japan Synthetic Rubber, cis-1,4 content: 97%, $ML_{1+4}^{100°\ C.}$: 44) was substituted for the n-hexane solution of IR2200. The results are shown in Table 3. It can be seen that a high-modulus rubber composition having a high tensile strength, with no decrease of tear strength, could be obtained even when BR was used.

EXAMPLE 13

The same procedure as in Example 8 was repeated, except that SBR#1500 (styrene-butadiene rubber produced by Japan Synthetic Rubber, styrene content: 23.5% by weight, $ML_{1+4}^{100°\ C.}$: 52) was substituted for the IR2200, in such an amount that the polypropylene content became 5% by weight, and the rubber composition was subjected to compounding and vulcanization, in which the vulcanization time was 60 minutes.

It can be seen that a high-modulus rubber composition having a high tensile strength, with no decrease of tear strength, could be obtained even when SBR was used.

EXAMPLES 14 AND 15

The same procedures as in Example 9 and Example 12 were repeated, except that the polypropylene content was changed to 15% by weight and 5% by weight, respectively. The results are shown in Table 3.

COMPARATIVE EXAMPLES 5-8

Polyisoprene rubber (IR2200 and IR-2210), polybutadiene rubber (BR01) and styrene-butadiene rubber (SBR#1500), each having not been mixed with poly(4-methyl-1-pentene) or polypropylene, were respectively comounded according to the recipe shown in Table 1. However, vulcanization was carried out at 145° C. for 20 minutes in the case of polyisoprene rubber and polybutadiene rubber and at 145° C. for 60 minutes in the case of styrene-butadiene rubber.

COMPARATIVE EXAMPLE 9

This is an example where 10% by weight of polypropylene having an average particle size of 400μ was mixed with IR2200. The rubber composition obtained according to this method was low in both modulus of elasticity and tensile strength.

COMPARATIVE EXAMPLE 10

An experiment was made in the same way as in Example 8, except that the solvent-swollen poly(4-methyl-1-pentene) was not pulverized well. The average particle size of poly(4-methyl-1-pentene) in the solidified rubber composition was 500μ. The results are shown in Table 4. The obtained rubber composition was low in both modulus of elasticity and tensile strength.

TABLE 3

| | Base rubber | Poly(4-methyl-1-pentene) (wt %) | Polypropylene (wt %) | Particle size (μ) | 100% modulus (Kg/cm²) | 300% modulus (Kg/cm²) | Tensile strength (Kg/cm²) | Elongation (%) | Tear strength (Kg/cm) |
|---|---|---|---|---|---|---|---|---|---|
| Example 8 | IR2200 | 7.5 | — | 0.32 | 56 | 158 | 245 | 480 | 90 |
| Example 9 | IR2200 | — | 10 | 0.28 | 50 | 142 | 287 | 480 | 62 |
| Example 10 | IR2210 | 7.5 | — | 0.25 | 54 | 137 | 231 | 490 | 75 |
| Example 11 | IR2210 | 5 | — | 0.20 | 47 | 135 | 246 | 510 | 99 |

TABLE 3-continued

| | Base rubber | Poly(4-methyl-1-pentene) (wt %) | Polypropylene (wt %) | Particle size (μ) | 100% modulus (Kg/cm$^2$) | 300% modulus (Kg/cm$^2$) | Tensile strength (Kg/cm$^2$) | Elongation (%) | Tear strength (Kg/cm) |
|---|---|---|---|---|---|---|---|---|---|
| Example 12 | BR01 | — | 10 | 0.38 | 76 | 209 | 198 | 280 | 62 |
| Example 13 | SBR#1500 | — | 5 | 0.35 | 41 | 200 | 289 | 420 | 58 |
| Example 14 | IR2200 | — | 15 | 0.28 | 67 | 220 | 310 | 510 | 70 |
| Example 15 | BR01 | — | 5 | 0.32 | 38 | 144 | 180 | 370 | 57 |
| Comp. Ex. 5 | IR2200 | — | — | — | 16 | 74 | 266 | 670 | 60 |
| Comp. Ex. 6 | IR2210 | — | — | — | 22 | 93 | 251 | 620 | 47 |
| Comp. Ex. 7 | BR01 | — | — | — | 24 | 107 | 140 | 360 | 47 |
| Comp. Ex. 8 | SBR#1500 | — | — | — | 34 | 158 | 263 | 440 | 57 |
| Comp. Ex. 9 | IR2200 | — | 10* | 400 | 28 | — | 100 | 280 | 55 |
| Comp. Ex. 10 | IR2200 | 5 | — | 500 | 23 | 100 | 119 | 350 | 56 |

*Powder-blending method

EXAMPLE 16

To 20 parts by weight of toluene was added one part by weight of poly(4-methyl-1-pentene) having a melting point of 235° C. (produced by ICI Inc.) to swell said polymer, and the swollen polymer was stirred in an aqueous solution of potassium salt of rosin acid by a high-speed mixer (Homomixer MV-H manufactured by Tokushu Kika Kogyo Co. Ltd.) at 10,000 r.p.m. During the latter half of the stirring operation, the polymer was steamed to remove the solvent. The potassium salt of rosin acid was used in an amount of 3 g per g of poly(4-methyl-1-pentene). The powder thus obtained was washed with water and then dried. It had an average particle size of 20μ.

This fine powder was added to an n-hexane solvent (the powder concentration: 1.5% by weight). To the mixture, while being maintained in the suspension state by stirring by means of a high-speed mixer (10,000 r.p.m.), was added a hexane solution (solids concentration: 10% by weight) of polyisoprene rubber (IR2200 produced by Japan Synthetic Rubber), followed by further stirring and mixing. The mixture was then poured into a large amount of methanol containing a small quantity of 2,5-di-t-butyl-p-cresol to be solidified. The solidified rubber composition was vacuum-dried for 24 hours and then compounded with the compounding agents according to the recipe shown in Table 1. The compound was subjected to press vulcanization at 145° C. for 20 minutes and vulcanizate was subjected to a tensile test and a tear test according to JIS K-6301 to determine the properties of the vulcanizate. The results are shown in Table 4. It can be seen that the produced rubber composition had excellent tear resistance and a high modulus of elasticity.

EXAMPLE 17

Polypropylene having a melting point of 165° C. (Noblene produced by Mitsubishi Yuka) was swollen by adding toluene in an amount of 20 parts by weight per part by weight of said polypropylene, and the swollen polymer was stirred with an aqueous solution of potassium salt of rosin acid by means of a high-speed mixer (10,000 r.p.m.). In the latter half of the stirring operation, the polymer was steamed to remove the solvent. The potassium salt of rosin acid was used in an amount of 3 g per g of polypropylene. The powder thus prepared was recovered and dried. It had an average particle size of 25μ.

The fine powder obtained was added to an n-hexane solvent (powder concentration: 1.5% by weight). To the mixture, while being maintained in the suspension state by stirring by means of a high-speed mixer (10,000 r.p.m.), was added a hexane solution of polyisoprene rubber (IR2200) (polymer concentration: 10% by weight), followed by further stirring and mixing.

The after-treatment and the compounding of the mixture were carried out in the same way as in Example 16. The results are shown in Table 4. They indicate excellent tear resistance and a high modulus of elasticity.

EXAMPLE 18

The procedure of Example 17 was repeated, except that a toluene solution of BR01 (polybutadiene rubber produced by Japan Synthetic Rubber) was substituted for the n-hexane solution of IR2200. The results show good tear resistance and a high modulus of elasticity.

EXAMPLE 19

The same procedure as in Example 16 was repeated, except that a toluene solution of SBR#1500 was substituted for the n-hexane solution of IR2200 and the content of poly(4-methyl-1-pentene) in the rubber composition was adjusted to 10% by weight.

COMPARATIVE EXAMPLES 11–13

IR2200, BR01 and SBR#1500, having not been mixed with poly(4-methyl-1-pentene) or polypropylene, were subjected, rspectively, to compounding according to the recipe shown in Table 5, provided vulcanization was performed at 145° C. for 20 minutes in the case of IR2200 and BR01 and at 145° C. for 60 minutes in the case of SBR#1500.

EXAMPLE 20

The procedure of Example 16 was repeated, except that the poly(4-methyl-1-pentene) content in the rubber composition was changed to 10% by weight.

EXAMPLE 21

The procedure of Example 18 was repeated, except that the isotactic polypropylene content in the rubber composition was changed to 5% by weight.

COMPARATIVE EXAMPLE 14

The procedure of Example 17 was repeated, except that isotactic polypropylene powder having an average particle size of 350μ was used. The results showed a little improvement in modulus of elasticity and a poor tensile strength.

TABLE 4

| | Base rubber | Poly(4-methyl-1-pentene) (wt %) | Polypropylene (wt %) | 100% modulus (Kg/cm$^2$) | 300% modulus (Kg/cm$^2$) | Tensile strength (Kg/cm$^2$) | Elongation (%) | Tear strength (Kg/cm) |
|---|---|---|---|---|---|---|---|---|
| Example 16 | IR2200 | 5 | — | 29 | 103 | 278 | 750 | 79 |
| Example 17 | IR2200 | — | 10 | 62 | 174 | 275 | 490 | 82 |
| Example 18 | BR01 | — | 10 | 49 | 199 | 234 | 375 | 59 |
| Example 19 | SBR#1500 | 10 | — | 55 | 156 | 198 | 400 | 60 |
| Example 20 | IR2200 | — | 10 | 38 | 118 | 255 | 570 | 70 |
| Example 21 | BR01 | — | 5 | 35 | 132 | 144 | 330 | 56 |
| Comp. Ex. 11 | IR2200 | — | — | 16 | 74 | 266 | 670 | 60 |
| Comp. Ex. 12 | BR01 | — | — | 24 | 107 | 140 | 360 | 47 |
| Comp. Ex. 13 | SBR#1500 | — | — | 34 | 158 | 263 | 440 | 57 |
| Comp. Ex. 9 | IR2200 | — | 10* | 28 | — | 100 | 280 | 55 |
| Comp. Ex. 14 | IR2200 | — | 10 | 28 | 100 | 115 | 330 | 56 |

*Powder blending method

What is claimed is:

1. A rubber composition having a high modulus of elasticity consisting essentially of a dispersion in which fine particles of a high-melting isotactic poly-α-olefin having a melting point of at least 150° C. are uniformly dispersed in a rubber matrix, said fine particles having an average particle size of not more than 200μ.

2. A rubber composition according to claim 1, wherein the high-melting isotactic poly-α-olefin particles have an average particle size of not more than 50μ.

3. A rubber composition according to claim 1, wherein the high-melting isotactic poly-α-olefin particles are dispersed in a ratio of 2 to 40% by weight based on the weight of the rubber composition.

4. A rubber composition according to claim 1, 2 or 3, wherein the high-melting isotactic poly-α-olefin is selected from the group consisting of isotactic polypropylene, polyallylcyclopentane, polyallylcyclohexane, polyallylbenzene, poly(3-methyl-1-butene), poly(3-cyclohexyl-1-butene), poly(4-phenyl-1-butene), poly(3-methyl-1-pentene), poly(4-methyl-1-pentene), poly(3-methyl-1-hexene), poly(4-methyl-1-hexene), polyvinylcyclopentane, a copolymer of propylene and allylbenzene, and a copolymer of 3-methyl-1-butene and 1-butene.

5. A rubber composition according to claim 1, 2 or 3, wherein the high-melting isotactic poly-α-olefin is isotactic polypropylene or poly(4-methyl-1-pentene).

6. A rubber composition according to claim 1, 2 or 3, wherein the rubber is selected from the group consisting of polyisoprene rubber butadiene rubber, styrene-butadiene rubber, butadiene-pentadiene-styrene rubber, ethylene-propylene rubber, isobutylene-isoprene rubber and natural rubber.

7. A rubber composition according to claim 4, wherein the rubber is selected from the group consisting of polyisoprene rubber butadiene rubber, styrene-butadiene rubber, butadiene-pentadiene-styrene rubber, ethylene-propylene rubber, isobutylene-isoprene rubber and natural rubber.

8. A rubber composition according to claim 6, wherein said rubber is polyisoprene rubber.

9. A rubber composition according to claim 7, wherein said rubber is polyisoprene rubber.

10. A rubber composition having a high modulus of elasticity consisting essentially of a dispersion in which fine particles of a high-melting isotactic polypropylene having a melting point of at least 150° C. are uniformly dispersed in a polyisoprene rubber matrix, said fine particles having an average particle size of not more than 200 microns.

* * * * *